United States Patent [19]

Chen

[11] Patent Number: 4,868,277

[45] Date of Patent: Sep. 19, 1989

[54] POLYAMIDE RESINS WITH GOOD TOUGHNESS PROPERTIES

[75] Inventor: Augustin T. Chen, Cheshire, Conn.

[73] Assignee: The Dow Chemical Company, Midland, Mich.

[21] Appl. No.: 234,342

[22] Filed: Aug. 18, 1988

[51] Int. Cl.$^4$ ............................................. C08G 63/02
[52] U.S. Cl. ................................. 528/272; 528/289; 528/302; 528/363; 528/367; 528/906
[58] Field of Search ............... 528/272, 289, 302, 363, 528/367, 906

[56] References Cited

U.S. PATENT DOCUMENTS

| | | | |
|---|---|---|---|
| 4,129,715 | 12/1978 | Chen et al. | 528/67 |
| 4,415,693 | 11/1983 | Chen et al. | 524/198 |
| 4,649,180 | 3/1987 | Chen et al. | 525/462 |
| 4,772,649 | 9/1988 | Andrews et al. | 524/195 |

Primary Examiner—John Kight
Assistant Examiner—S. A. Acquah
Attorney, Agent, or Firm—James S. Rose

[57] ABSTRACT

Disclosed is a novel class of linear segmented non-elastomeric thermoplastic polyesteramides. The polymers are easily obtained by reacting a carboxylic acid-terminated prepolymer (derived by reacting at least a two-molar proportion of a dicarboxylic acid with a polymeric diol of molecular weight 400 to 6000), a dicarboxylic acid, and a diisocyanate.

The polymers so obtained have nylon-like properties, particularly nylon 11 or 12, but are characterized by superior high temperature properties therefrom. At the same time, they have excellent toughness and very low water absorption characteristics.

11 Claims, No Drawings

POLYAMIDE RESINS WITH GOOD TOUGHNESS PROPERTIES

FIELD OF THE INVENTION

This invention relates to polyesteramides and is more particularly concerned with non-elastomeric polyesteramides derived from carboxylic acid terminated prepolymers, diisocyanates and dicarboxylic acids.

DESCRIPTION OF THE PRIOR ART

The polyamides such as the nylons known as nylon 6 and 66 have long been recognized for their wide range of utility in the manufacture of molded parts. While enjoying many excellent physical properties they do suffer some drawbacks of which the major ones are relatively low toughness or impact strength and high moisture pick-up. These particular defects limit their use in the manufacture of any parts exposed to high humidity conditions because the moisture absorption results in loss of dimensional strength. The advent of nylon 11 and 12 has, to a large degree, corrected the deficiencies of toughness and water absorption but this has been at the expense of high temperature resistance when compared with nylon 6 and 66.

Accordingly, there remains a need for a thermoplastic polymer similar to the nylons which can satisfy all three requirements of good toughness, resistance to elevated temperatures, and low moisture absorption.

A class of polyesteramides has been disclosed in U.S. Pat. Nos. 4,129,715 and 4,649,180. These polymers represent the first elastomers to have high aromatic contact while at the same time being easily injection moldable. These disclosed polymers are completely unrelated to the above nylons both structure-wise and property-wise. They are fully elastomeric in character having elongation properties well in excess of 200 percent and hardness properties no higher than can be measured on the Shore D scale (ASTM Test Method D-2240). In order to achieve their intended purpose, the reference patents clearly call for aromatic moieties in the polymer backbone. Additionally, the molar fraction of hard segments associated with the aromatic moieties must not exceed certain specified upper limits. This limitation is defined by the value of x in the recurring units of formula (1) (see U.S. Pat. No. 4,129,715, column 2) as having an upper limit of 10. As will be apparent from the discussion below, these reference polyesteramides while related structure-wise to the polyesteramides in accordance with the present invention, are completely unrelated property-wise.

SUMMARY OF THE INVENTION

This invention is directed to linear segmented non-elastomeric thermoplastic polyesteramides having an elongation not greater than 150 percent and characterized by a recurring unit of the formula

wherein R is selected from the group consisting of alkylene, cycloalkylene, and arylene, A is the residue of a polymeric diol HOAOH having a molecular weight from about 400 to about 6000, B is the residue of a dicarboxylic acid HOOC—B—COOH selected from the class consisting of aliphatic dicarboxylic acids having from 6 to 14 carbon atoms, inclusive, isophthalic and terephthalic acids, m has a mean value of less than one and greater than 0, D is the residue of a dicarboxylic acid HOOC—D—COOH such that the melt temperature of the hard segment derived therefrom is not greater than 325° C., and y has an average value greater than 10.

This invention is particularly directed to a polyesteramide (II) in accordance with formula (I) above wherein R is 4, 4,'-methylenebis(phenylene), A is the residue of a polyester glycol of molecular weight from about 1000 to about 3000, B is the residue of an aliphatic dicarboxylic acid having from 6 to 14 carbon atoms, inclusive, m has the value defined above, D is the residue of an aliphatic dicarboxylic acid, and y has an average value of from about 11 to about 40.

The term "non-elastomeric" means the opposite to elastomeric is describing a polymer which after elongation does not recover fully after release of a stress. Generally speaking, a true elastomer describes a material which can be elongated by at least 200 percent strain and still full recover after releasing the stress. The stiffness or modulus properties of the present polymers are such that they will not elongate beyond about 150 percent without breakage, more likely, they will not elongate beyond 50 percent.

The term "alkylene" refers to alkylene meaning straight- and branched-chain alkylene having 4 to 12 carbon atoms, inclusive, such as butylene, pentylene, hexylene, heptylene, octylene, nonylene, decylene, undecylene, dodecylene, and isomeric forms thereof.

The term "cycloalkylene" means cycloalkylene having 5 to 16 carbon atoms, inclusive, such as 1,3-cyclopentylene, 1,3-cyclohexylene, 14-cyclohexylene, 2-methyl-1,4-cyclohexylene, radicals having the formula

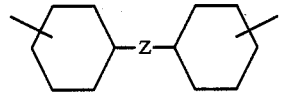

wherein Z is selected from the group consisting of —CO—, —O—, —SO$_2$— and alkylene having 1 to 4 carbon atoms, inclusive, such as methylene, ethylene, propylene, ethylidene, isopropylidene, and the like.

The term "arylene" means arylene having 6 to 18 carbon atoms, inclusive, such as phenylene, tolylene, naphthylene, diphenylylene, and radicals having the formula

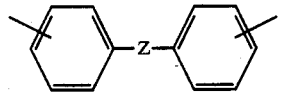

wherein Z is defined as above.

The radicals defined by R above can be substituted by one or a plurality of inert substituents. The term "inert substitutent" means a substituent which is inert under the conditions of the polymerization process and does not otherwise detract from the polymer's inherent physical properties. Illustrative of such substituents are halo, i.e., chloro, bromo, fluoro, and iodo; alkyl from 1 to 8 carbon atoms, inclusive, such as methyl, ethyl, propyl, butyl, pentyl, hexyl, heptyl, octyl, and isomeric forms thereof; alkoxy from 1 to 8 carbon atoms, inclusive, such as methoxy, ethoxy, propoxy, butoxy, pentyloxy, hexyloxy, heptyloxy, octyloxy and the like; cyano, and the like. Obviously, when R is alkylene, any inert substituents selected from alkyl would be included in those alkylene radicals in isomeric form.

The term "polymeric diol" as used herein to characterize residue A in formula (I) is inclusive of polyether, polyester, and polycarbonate diols having molecular weights in the stated range.

The term "aliphatic dicarboxylic acids having from 6 to 14 carbon atoms" means the acids represented by the formula $HOOC-C_nH_{2n}-COOH$ wherein the total number of carbon atoms, including those in the carboxylic groups, lies within the stated range and $C_nH_{2n}$ represents straight- or branched-chain alkylene having the appropriate carbon atom content. Illustrative of such acids are adipic, pimelic, suberic, azelaic, sebacic, 1,11-undecandioic and 1,12-dodecandioic, $\alpha$-methyladipic, $\alpha,\alpha$-dimethyladipic, $\alpha$-ethylpimelic, $\alpha$-ethyl-$\alpha$-methylpimelic, $\beta,\beta'$-diethyl-$\beta,\beta'$-dimethylsuberic, 2,2,4-trimethyladipic, 2,4,4-trimethyladipic, $\alpha,\alpha$-dimethylazelaic, and $\alpha,\alpha,\alpha',\alpha'$-tetramethylsebacic acids.

The term "molecular weight" means the number average molecular weight as determined by end-group analysis or other colligative property measurement.

Surprisingly, the present polyesteramides, while having recurring units very similar to those disclosed in the cited references, are possessed of physical properties completely unrelated to those same polymers. In fact, the present polymers have the properties characteristic of the nylons discussed above and are not elastomers in their behavior.

The reference polymers must have aromatic moieties in the backbone and the molar hard segment contents derived therefrom are specifically limited as noted above to achieve the desired thermal formability, i.e., injection moldability. Quite unexpectedly it has been found that by raising the hard segment content, that is to say, raise the values of x in the reference polymers to those values y called for presently, the polymers obtained are not only injection moldable but are possessed of entirely different properties. Furthermore, it has been discovered that simply increasing the hard segment content provides for polymer backbones wherein the radical R need not be limited to aromatic moieties as in the reference, but can include other types of non-aromatic radicals yet still achieve good high temperature resistance.

This discovery is considered to be quite significant since it provides a class of polymers meeting the needs set forth above for a nylon-type plastic having good toughness, good resistance to high temperatures, and low moisture pick-up.

The polyesteramides of this invention can be employed in any of those applications for which nylon 11, nylon 12 or nylon ST are useful. They can find particular utility in the manufacture of sheathing for cables, for hoses used in air brakes on trucks, for fuel lines in fuel injected automobile engines and aircraft, and the like. Increasing applications for such polymers are in the sporting goods area including badminton shuttlecocks and protective gear such as shin, shoulder, elbow and knee pads, protective headgear, and the like.

Detailed Description of the Invention

The polyesteramides having the formula (I) above are readily prepared using the typical ingredients and procedures of U.S. Pat. Nos. 4,129,715 and 4,649,180 whose disclosures relative thereto are incorporated herein by reference. The novelty in the present polymers resides in the higher levels of hard segment residues in the recurring units as compared with the referenced polymers. This is reflected in the higher values for y in the formula (1) above as compared with the value of x in the formula (1) of '715. In the present case, y has an average value greater than 10. Advantageously, y has an average value of from about 11 to about 40, preferably from about 12 to about 30.

The term "hard segment" refers to the amide linkages formed from the acid residues of B and D as opposed to the "soft segments" arising from the polymeric diol residue A.

The polyesteramides are prepared by a two-step procedure. In the first step of the procedure there is prepared a carboxylic acid-terminated polyester by reacting at least 2 molar proportions of a dicarboxylic acid HOOC—B—COOH wherein B is as hereinbefore defined, or a mixture of two or more such acids, with one molar proportion of a polymeric diol HO—A—OH having a molecular weight within the range stated above. Preferably, the proportion of dicarboxylic acid is in excess of 2 moles per mole of diol and a particularly preferred proportion is within the range of about 2.1 moles to about 2.4 moles of acid per mole of diol.

The preparation of the carboxylic acid-terminated polyester prepolymer is carried out in accordance with procedures well-known in the art for such prepolymers. Illustratively, the free acid and the polymeric diol are heated in the presence of a solvent such as toluene, xylene, and the like, and the water of condensation is removed azeotropically from the reaction mixture. If desired, an esterification catalyst such as antimony trioxide, p-toluene sulfonic acid, calcium acetate, and the like, can be employed but the use of catalysts of this nature is generally unnecessary except in a few instances in which the esterification proceeds slowly. When the amount of water of condensation removed from the reaction mixture corresponds to the theoretically calculated quantity, i.e., 2 moles for each mole of diol, the carboxylic acid-terminated prepolymer is isolated by removing the solvent by distillation, advantageously under reduced pressure.

The dicarboxylic acids employed in the preparation of the carboxy-terminated prepolymers can be any of the aliphatic dicarboxylic acids having from 6 to 14 carbons as defined and exemplified above or the two aromatic acids. Preferred as a group are the aliphatic dicarboxylic acids. Preferred species within this group include adipic, pimelic, suberic, azelaic, and sebacic acids, and mixtures thereof.

The polymeric diols defined above preferably have a molecular weight falling within a range of from about 1000 to about 3000. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene and the like, and copolymers of said alkadienes with vinyl monomers such as acrylonitrile, methacrylonitrile, styrene, and the like. Preferred polyether diols for use in preparing the polyesteramides are poly(tetramethylene glycol) and ethylene oxide-capped polypropylene glycols wherein the ethylene oxide content is within the range of about 5 percent to about 40 percent.

Illustrative of the polyester diols are those obtained by reacting a dicarboxylic acid such as adipic, suberic, azelaic, glutaric acids and the like, with an excess, over the stoichiometric amount, of a dihydric alcohol such as ethylene glycol, propylene glycol, 1,4-butanediol, 1,6-hexanediol and the like, including mixtures of two or more such diols. Preferred polyester diols are the poly(-tetramethylene)-adipates, -suberates, -azelates, and -glutarates, and poly(hexamethylene)adipates, -suberates, -azelates, and -glutarates.

Illustrative of the polycarbonate diols are those having the recurring polycarbonate linkage —$ROCO_2$— wherein R can be $C_{2-25}$ alkylene, $C_{5-8}$ cycloalkylene, or $C_{6-18}$ arylene, and exemplified in U.S. Pat. No. 4,649,180, disclosure of which is already incorporated herein.

It will be readily understood by one skilled in the art that in the case of the polyester diols, an alternate route to their carboxylic acid-terminated polyester component consists of the direct polymerization of an excess of any of the appropriate dicarboxylic acids set forth above with any of the appropriate dihydric alcohols also set forth above.

In an alternative embodiment, the carboxy-terminated prepolymers can include the carboxy-terminated copolymers of butadiene and acrylonitrile or like vinyl monomer. Illustrative of such materials are those available under the trade name Hycar.

An overall preferred class of diols HOAOH comprises the polyester glycols discussed above.

In the second step of tee polymer preparation, the carboxylic acid-terminated polyester is reacted with a diisocyanate $R(NCO)_2$ and diacid HOOC—D—COOH wherein R and D are as defined above. Illustrative examples of diisocyanates are hexamethylene diisocyanate, decamethylene diisocyanate, 2,2,4-trimethylhexylene diisocyanate, 2,4,4-trimethylhexylene diisocyanate, 3-isocyanatomethyl-3,5,5-trimethylcyclohexylisocyanate, 1,4-cyclohexane diisocyanate, 1,3-cyclohexane diisocyanate, 1-methyl-2,5-cyclohexylene diisocyanate, 4,4'-methylenebis(cyclohexylisocyanate), 4,4'-isopropylidenebis(cyclohexyl isocyanate), m- and p-phenylene diisocyanate, chlorophenylene diisocyanate, 2,4- and 2,6-toluene diisocyanates and mixtures thereof, α,α'-xylylene diisocyanate, 1,5-naphthalene diisocyanate, 4,4'-methylenebis(phenyl isocyanate), mixtures of 4,4'- and 2,4'-methylenebis(phenyl isocyanate), liquefied forms of methylenebis(phenyl isocyanate) such as those resulting from the diisocyanates which have been treated so as to convert a minor proportion of the diisocyanate to the corresponding carbodiimide which latter is in equilibrium with further diisocyanate to form uretone-imine groups (for example see U.S. Pat. No. 3,384,653) and mixtures of any of the above diisocyanates.

A preferred class of diisocyanates comprise the arylene diisocyanates which give rise to the arylene radical R in formula (1). A particularly preferred member of this class is methylenebis(phenyl isocyanate), more particularly the 4,4'-isomer.

In respect of the dicarboxylic acid HOOC—D—COOH, the only real limitation is the fact that the hard segment amide arising from its reaction with an isocyanate group shall not have a melt temperature exceeding 325° C. Advantageously, the acid is a straight-chain aliphatic dicarboxylic acid having from about 6 to about 9 carbon atoms (inclusive of those in the carboxylic groups) but other dicarboxylic acids can be employed provided that the above melt temperature conditions are satisfied. Illustrative of such acids are adipic, azelaic, sebacic, suberic, and trimethyladipic acids. Particularly preferred are azelaic and adipic as well as a mixture of approximately equimolar amounts of these two acids. It will be readily apparent to one skilled in the art that the radicals B and D in formula (1) can be identical or different depending on the choice of diacids in each case.

The proportions in which the dicarboxylic acid HOOC—D—COOH is employed will be governed largely by the properties desired in the resulting polyesteramide in combination with the selection made for the other radicals A, B, and R in the formula (I) above. Suffice it to say, the acid must be employed in a greater than 10 mole proportion per mole of the carboxylic acid-terminated prepolymer component which already contains the radicals A and B. Advantageously, the acid is employed in a range of from about 11 to about 40 moles per mole of prepolymer and, preferably, from about 12 to about 30 moles. It will be recognized by one skilled in the art that these molar proportions will result in the average values for y set forth above.

The overall proportions of these three ingredients are such that the total carboxylic acid equivalents and isocyanate equivalents are substantially equal.

Advantageously, but not necessarily, the reaction is carried out in the presence of an inert organic solvent in which the reactants are soluble. By "inert organic solvent" is meant an organic solvent which does not enter into reaction with any of the reactants or with the product and which does not interfere with the desired course of the reaction in any other way. Illustrative of inert organic solvents are tetramethylenesulfone, dichlorobenzene, monochlorobenzene, α-butyrolactone, N-methylpyrrolidone, N,N-dimethylformamide, N,N-dimethylacetamide, xylene, and the like including mixtures of two or more such solvents.

The reaction is carried out advantageously at elevated temperatures in the range of about 100° C. to about 250° C. and most advantageously in the range of about 150° C. to about 230° C. The reaction is assisted in most cases by the inclusion in the reaction mixture of a catalyst for the reaction between isocyanato and carboxylic acid groups. Any of the catalysts known in the art for this purpose can be employed such as the alkali metal alkoxides (described in U.S. Pat. No. 4,001,186), the N-alkali metal lactamates (described in U.S. Pat. No. 4,021,412), the pholene-1-oxides or 1-sulfides (described in U.S. Pat. Nos. 2,663,737 and '738) and the phospholane-1-oxides or 1-sulfides (described in U.S. Pat. No. 2,663,739). The disclosures of these five patents are hereby incorporated herein by reference. A particularly preferred group of catalysts comprises 1,3-dimethyl-2-phospholene-1-oxide, 1,3-dimethyl-3-phospholene-1-oxide and mixtures of these two isomers: 1-methyl-2-phospholene-1-oxide, 1-methyl-3-phospholene-1-oxide and mixtures of these two isomers.

The above catalysts are generally employed in amounts corresponding to about 0.001 percent to about 0.5 percent by weight of total reactants and preferably in amounts corresponding to about 0.02 percent to about 0.3 percent by weight of total reactants.

The progress of the reaction is readily followed by conventional techniques such as infrared or nuclear magnetic resonance spectroscopy. The end point of the reaction is determined by disappearance of absorption bands characteristic of the carboxylic acid group.

When the reaction is determined to be complete, by techniques such as those mentioned above, the desired polyesteramide can be recovered from the reaction mixture by pouring the latter into a solvent such as methanol, acetone, hexane, water, and the like in which the polymer is insoluble. The polymer generally precipitates in the form of strands which quickly solidify and which can be comminuted by any of the known techniques such as crushing, pelletizing, and the like. The polymer, either before or after comminution, can be washed, if desired, with appropriate solvents and then dried using conventional procedures.

The polyesteramides can have incorporated any additives which do not detract from the polymer's inherent properties to any significant degree. Typical of such additives are fillers, antioxidants, pigments, fire retardants, plasticizers, release agents, wax lubricants, reinforcing agents such as glass fibers, and the like.

The present polymers are non-elastomeric and, accordingly, are characterized by low elongations, i.e., no greater than 150 percent. While having good resistance to elevated temperatures they are easily injection moldable. In this connection, their high temperature stability as measured by their heat deflection temperature (HDT) at a test pressure of 264 psi in accordance with ASTM Test Method D-648-56 can easily exceed 100° C.

Further, the toughness of the present polymers as measured by Izod impact test in accordance with ASTM Test Method D-256-56 is at least one ft lb/inch.

Yet another characteristic feature of the present polymers is their very low moisture pick-up as measured in accordance with ASTM Test Method 570. This pick-up is less than 1 percent by weight and generally no greater than 0.25 percent based on test sample weight.

Of most significance is the fact that the hardness of the instant polymers is characterized by a value of at least 50 as measured on the Rockwell M scale in accordance with ASTM Test Method D-785.

The present polymers can be molded into useful articles using any of the conventional methods for molding thermoplastic materials. This includes compression molding, extrusion, injection molding, and the like. Further, films are readily prepared by casting solutions of the polymers and removing the solvent. Molded articles find the greatest utility.

The following examples describe the manner and process of making and using the invention and set forth the best mode contemplated by the inventor of carrying out the invention but are not to be construed as limiting.

EXAMPLE 1

A two-liter resin kettle is fitted with a mechanical stirrer, thermometer, reflux condenser, gas inlet tube and addition funnel. The kettle is charged with 66.44 g (0.066 mole) of a carboxylic acid-terminated polybutylene azelate of molecular weight of about 1000, 186.2 g (0.99 mole) of azelaic acid, 4 g of stearic acid and 900 ml of tetramethylenesulfone (TMS). Under a positive stream of nitrogen the ingredients are heated to about 218° C. At this point, 1.32 g of 1,3-dimethylphospholene oxide (DMPO) catalyst is added. Then over a two-hour period during stirring and under nitrogen at the above temperature, a solution of 263.1 g (1.05 moles) of 4,4'-methylenebis(phenyl isocyanate) (MDI) dissolved in 350 ml of tetramethylenesulfone is added. Stirring at the 218° C. temperature is continued for an additional two-hour period. The light yellow solution is cooled down to ambient room temperature (about 20° C.) It is slowly poured into about two gallons of water causing the precipitation of the polymer into solid strands. The solidified polymer is separated from the liquid phase by decantation and chopped into small pieces. The product is further washed by stirring in a fresh two-gallon portion of water. The solid is isolated by filtration and thoroughly dried. Thus, there is obtained 420 g of a polyesteramide in accordance with the formula (I) above wherein both B and D are residues of azelaic acid, A represents the residue of a polybutylene azelate glycol, R represents 4,4'-methylenebisphenylene, m has the value set forth above and y has a mean value of about 16; inherent viscosity ($n_{inh}$) determined at 0.5 percent by weight in N-methylpyrrolidone containing 4 percent by weight lithium chloride at 30° C. is 1.02 for virgin polymer.

The polymer is extruded through a Brabender extruder in the form of ⅛ rod at a screw speed of 40 rpm and torque about 500 m-g with zone temperatures of #1=265° C.; #2=270° C.; #3=270° C.; #4=268° C. The rods are chopped into pellets and injection molded into 8½"×⅛" dumbbell test bars (ASTM D638) and into 5"×½"×⅛" flex bars (ASTM D790) using an Arburg model 221E injection molding machine under the following conditions: zone temperatures, #1=270° C.; #2=275° C.; #3=275° C.; injection speed=4 seconds; injection pressure=800 psi: injection time=15 seconds; cycle time=35 seconds; mold temperature=88° C. The polyesteramide is characterized by the physical properties set forth in Table I. The physical properties of commercially available samples of nylon 66, nylon 11, and nylon 12 are also set forth in Table 1 for direct comparison with the Example 1 polyesteramide properties.

TABLE I

| Sample | Ex. 1 | nylon 66 | nylon 11 | nylon 12* |
|---|---|---|---|---|
| Tensile str. (psi) | | | | |
| Yield | 10,580 | 10,600 | 5,010 | 6,100 |
| Break | 8,460 | 7,990 | 6,240 | — |
| Elongation (%) | | | | |
| Yield | 7.1 | 18.0 | 5 | 20 |
| Break | 25.0 | 32.0 | 190 | — |
| Tensile Modulus (kpsi) | 275.0 | 318.0 | 155.5 | — |
| Flex Modulus (kpsi) | 302.0 | 412.0 | 172.1 | 180.0 |
| Flex str. (psi) | 14,720 | — | 7,230 | — |
| Tg (°C.)[1] | 102 | — | 55 | — |
| Rockwell Hardness[2] (M Scale) | 83 | — | 58 | — |
| HDT (°C.)[3] 264 psi | 85 | 180 | 53 | 55 |
| Notched Impact[4] (ft lb/in. notch) | 1.48 | 0.60 | 2.1 | 1.6 |
| Water Absorption[5] | | | | |

TABLE I-continued

| Sample | Ex. 1 | nylon 66 | nylon 11 | nylon 12* |
|---|---|---|---|---|
| (% by weight) | 0.10 | — | 0.18 | — |

*Nylon 12 property values obtained from Modern Plastics Encyclopedia 1986-1987 Edition, McGraw-Hill
[1] Tg = Glass transition temperature measured by differential scanning calorimetry (using DuPont Model 990 Thermal Analyzer with Model 910 DSC module)
[2] Rockwell hardness: Hardness measured in accordance with ASTM Test Method D785 using a Galileo A-200 Instrument (Galileo of Milan, Milan Italy)
[3] HDT: Heat deflection temperature measured in accordance with ASTM Test Method D648-56 at the two specified pressures
[4] Notched Izod: Izod impact strength measured in accordance with ASTM Test Method D256-56
[5] Water absorption: Measures the percent by weight gain of a molded sample stored in water for 24 hours at 73° F. in accordance with ASTM Test Method 570

The polyesteramide embodied in Example 1 is observed to have modulus properties similar to nylon 66 but with impact strengths more characteristic of the nylons 11 and 12. At the same time, the HDT of Example 1 is considerably superior to those values for nylons 11 and 12. Also the polyesteramide is observed to have low water absorption characteristics, similar to the nylons 11 and 12 and much lower than nylon 66. The latter material was not tested in this experiment but is known from the literature to have a moisture pick-up of about 8 to 10 weight percent when tested under the recited ASTM test conditions.

EXAMPLE 2

The following experiment describes the preparation of a polyesteramide in accordance with the present invention using virtually the identical procedures described above in Example 1 except for the employment of the following ingredients.

The resin kettle is charged with 60.4 g (0.056 mole) of a carboxylic acid-terminated polyhexylene adipate of molecular weight of about 1000, 176.72 g (0.926 mole) of azelaic acid, 5 g of stearic acid and 900 ml of tetramethylenesulfone. The solution is heated to 220° C. followed by the addition of 1.25 g of 1,3-dimethylphospholene oxide and 250.9 g (1.044 mole) of 4,4'-methylenebis(phenyl isocyanate) in 350 ml of tetramethylenesulfone over the two-hour addition period. The yellow solution is heated at 220° C. for two hours. The polymer product is precipitated by pouring the yellow solution into the two-gallon portion of water and the solid polymer purified similarly to Example 1 above. Thus there is obtained 400 g of a polyesteramide in accordance with formula (I) above where B and D are residues of adipic and azelaic acid respectively, while A represents the residue of, a polyhexylene adipate glycol, R represents 4,4'-methylenebisphenylene, m has the value set forth above and y has a mean value of about 16.5; $n_{inh}$ determined as in Example 1=0.96.

The polymer is extruded and injection molded using the same conditions as in Example 1 above except for an injection speed of 3 and mold temperature of 98° C. in the injection molding step. The molded parts are characterized by the following physical properties.

| Tensile str. (psi) | |
|---|---|
| Yield | 10,050 |
| Break | 8,760 |
| Elongation (%) | |
| Yield | 5.5 |
| Break | 18.0 |
| Tensile modulus | |
| (kpsi) | 302.2 |
| Flex modulus | |
| (kpsi) | 336.6 |
| Flex str. (psi) | 5,330 |
| HDT (°C.) 264 psi | 115 |
| Notched Impact | |
| (ft lb/in. notch) | 2.11 |

EXAMPLE 3

The following experiment describes the preparation of a polyesteramide in accordance with the present invention using virtually the identical procedures described in Example 1 except for the employment of the following ingredients.

A three-liter resin kettle is charged with 149.1 g (0.146 mole) of a carboxylic acid-terminated polybutylene azelate of molecular weight of about 1000, 305.3 g (1.60 moles) of azelaic acid and 1700 ml of tetramethylenesulfone. The solution is heated to about 225° C. followed by the addition of 2.18 g of 1,3-dimethylpospholene oxide and 436.4 g (1.746 moles) of 4,4'-methylenebis(phenyl isocyanate) in 400 ml of tetramethylenesulfone over the two-hour addition period. The yellow solution is heated at 225° C. for two hours. The polymer product is isolated and purified as previously described. Thus there is obtained 730 g of a polyesteramide in accordance with formula (I) above wherein both B and D are residues of azelaic acid, A represents the residue of a polybutylene azelate glycol, R represents 4,4'-methylenebisphenylene, m has the value set forth above and y has a mean value of about 11: $n_{inh}$ determined as above=0.82.

The polymer is extruded and injection molded similarly to Example 1 but under the following conditions: extruder conditions; zone temperatures #1=255° C.; #2=260° C.; #3=265° C.; #4=265° C.; screw speed=40 rpm and torque 600 m-g: conditions; zone temperatures #1=260° C.; #2=262° C.; #3=265° C.; injection speed=4; injection pressure=600 psi; injection time=15 seconds; cycle time=30 seconds; mold temperature=88° C. The polyesteramide is characterized by the following physical properties.

| Tensile str. (psi) | |
|---|---|
| Yield | 9,300 |
| Break | 8,610 |
| Elongation (%) | |
| Yield | 7.0 |
| Break | 51.0 |
| Tensile modulus | |
| (kpsi) | 293.9 |
| Flex modulus | |
| (kpsi) | 248.8 |
| Flex str. (psi) | 10,730 |
| Rockwell Hardness | |
| (M scale) | 68 |
| Tg (°C.) | 105 |
| HDT (°C.) 264 psi | 118 |
| Notched Impact | |
| (ft lb/in. notch) | 1.13 |
| Water Absorption | |
| (% by wt.) | 0.12 |

EXAMPLE 4

The following experiment describes the preparation of a polyesteramide in accordance with the present invention using virtually the identical procedure described in Example 1 except for the employment of the following ingredients.

A three-liter resin kettle is charged with 208.9 g (0.0675 mole) of a carboxylic acid-terminated polybutylene azelate of molecular weight of about 3000, 205.3 g (1076 mole) of azelaic acid and 1400 ml of tetramethylenesulfone. The solution is heated to about 225° C. followed by the addition of 1.43 g of 1,3-dimethylphospholene oxide and 285.8 g (1.143 moles) of 4,4'-methylenebis(phenyl isocyanate) in 320 ml of tetramethylenesulfone over the two-hour addition period. The yellow solution is heated at 225° C. for two hours. The polymer product is isolated and purified as previously described. Thus there is obtained 595 g of a polyesteramide in accordance with formula (I) above wherein both B and D are residues of azelaic acid, A represents the residue of a polybutylene azelate glycol, R represents 4,4'-methylenebisphenylene, m has the value set forth above and y has a mean value of about 16; $n_{inh}$ determined as above =0.87.

The polymer is extruded and injection molded as described in Example 1 but under the following conditions: extruder conditions: zone temperatures #1=250° C.; #2=250° C.; #3=260° C.; #4=260° C.; screw speed=40 rpm and torque 600 m-g; injection conditions; zone temperatures #1=267° C.; #2=272° C.; #3=272° C.; injection speed=4.5: injection pressure=800 psi; injection time=15 seconds; cycle time=30 seconds; mold temperature=140° C. The polyesteramide is characterized by the following physical properties.

| Tensile str. (psi) | |
|---|---|
| Yield | 4,360 |
| Break | 5,460 |
| Elongation (%) | |
| Yield | 7.0 |
| Break | 130.0 |
| Tensile modulus (kpsi) | 75.7 |
| Flex modulus (kpsi) | 161.2 |
| Flex str. (psi) | 6,900 |
| Rockwell Hardness (M scale) | 51 |
| Tg (°C.) | 87 |
| HDT (°C.) 264 psi | 67 |
| Notched Impact (ft lb/in. notch) | 3.66 |
| Water Absorption (% by wt.) | 0.25 |

EXAMPLE 5

The following experiment describes the preparation of a polyesteramide in accordance with the present invention using virtually the identical procedure described in Example 1 except for the employment of the following ingredients.

A three-liter resin kettle is charged with 148.5 g (0.048 mole) of a carboxylic acid-terminated polyhexylene azelate of molecular weight of about 3000, 246.1 g (1.29 moles) of azelaic acid and 1350 ml of tetramethylenesulfone. The solution is heated to about 225° C. followed by the addition of 1.67 g 1,3-dimethylphospholene oxide and 334.5 g (1.34 moles) of 4,4'-methylenebis(phenyl isocyanate) in 320 ml of tetramethylenesulfone over the two-hour addition period. The yellow solution is heated at 225° C. for two hours. The polymer product is isolated and purified as previously described. Thus there is obtained 610 g of a polyesteramide in accordance with formula (1) above wherein both B and D are residues of azelaic acid, A represents the residue of a polyhexylene azelate glycol, R represents 4,4'-methylenebisphenylene, m has the value set forth above and y has a mean value of about 26; $n_{inh}$ determined as above =1.07.

The polymer is extruded and injection molded as described in Example 1 but under the following conditions: extruder conditions; zone temperatures #1=260° C.; #2=260° C.; #3=270° C.; #4=270° C.; screw speed=40 rpm and torque 1350 m-g; injection conditions; zone temperatures #1=267° C.; #2=272° C.; #3=272° C.; injection speed=4.5,.injection pressure=800 psi; injection time=15 seconds; cycle time=30 seconds; mold temperature=140° C. The polyesteramide is characterized by the following physical properties.

| Tensile str. (psi) | |
|---|---|
| Yield | 6,880 |
| Break | 7,560 |
| Elongation (%) | |
| Yield | 7.5 |
| Break | 84.0 |
| Tensile modulus (kpsi) | 178.8 |
| Flex modulus (kpsi) | 230.9 |
| Flex str. (psi) | 9,910 |
| Rockwell Hardness (M scale) | 62 |
| Tg (°C.) | 101 |
| HDT (°C.) 264 psi | 83 |
| Notched Impact (ft lb/in. notch) | 1.31 |
| Water Absorption (% by wt.) | 0.14 |

What is claimed is:

1. A linear segmented non-elastomeric thermoplastic polyesteramide having an elongation not beyond 150 percent and characterized by a recurring unit of the formula

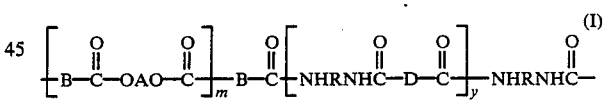

wherein R is selected from the group consisting of alkylene, cycloalkylene, and arylene, A is the residue of a polymeric diol HOAOH having a molecular weight from about 400 to about 6000, B is the residue of a dicarboxylic acid HOOC—B—COOH selected from the class consisting of aliphatic dicarboxylic acids having from 6 to 14 carbon atoms, inclusive, isophthalic and terephthalic acids, m has a mean value of less than 1 and greater than 0, D is the residue of a dicarboxylic acid HOOC—D—COOH such that the melt temperature of the hard segment derived therefrom is not greater than 325° C., and y has an average value of from about 11 to about 40.

2. A polyesteramide according to claim 1 wherein R is arylene.

3. A polyesteramide according to claim 1 wherein A is the residue of a polyester glycol.

4. A polyesteramide according to claim 1 wherein B is the residue of an aliphatic dicarboxylic acid having from 6 to 14 carbon atoms, inclusive.

5. A polyesteramide according to claim 1 wherein D is the residue of an aliphatic dicarboxylic acid.

6. A polyesteramide according to claim 1 wherein R is 4,4'-methylenebis(phenylene), A is the residue of a polyester glycol having a molecular weight of from about 1000 to 3000, B is the residue of an aliphatic dicarboxylic acid having from 6 to 14 carbon atoms, inclusive, D is the residue of an aliphatic dicarboxylic acid, and y has an average value of from about 11 to 40.

7. A polyesteramide according to claim 6 wherein D represents the residue from azelaic acid.

8. A polyesteramide according to claim 7 wherein A and B are the residues of a polybutylene azelate glycol and azelaic acid respectively.

9. A polyesteramide according to claim 7 wherein A and B are the residues of a polyhexylene adipate glycol and adipic acid respectively.

10. A polyesteramide according to claim 7 wherein A and B are the residues of a polyhexylene azelate glycol and azelaic acid respectively.

11. A molded article of a polyesteramide according to claim 1.

* * * * *